United States Patent
Yu et al.

(10) Patent No.: US 12,131,492 B2
(45) Date of Patent: Oct. 29, 2024

(54) CALIBRATION PARAMETER OBTAINING METHOD AND APPARATUS, PROCESSOR, AND ELECTRONIC DEVICE

(71) Applicant: ARCSOFT CORPORATION LIMITED, Zhejiang (CN)

(72) Inventors: Li Yu, Zhejiang (CN); Lei Yuan, Zhejiang (CN); Wang Miao, Zhejiang (CN); Jin Wang, Zhejiang (CN)

(73) Assignee: ARCSOFT CORPORATION LIMITED, Zhejiang (CN)

( * ) Notice: Subject to any disclaimer, the term of this patent is extended or adjusted under 35 U.S.C. 154(b) by 497 days.

(21) Appl. No.: 17/631,475

(22) PCT Filed: Jul. 16, 2020

(86) PCT No.: PCT/CN2020/102491
§ 371 (c)(1),
(2) Date: Jan. 30, 2022

(87) PCT Pub. No.: WO2021/022989
PCT Pub. Date: Feb. 11, 2021

(65) Prior Publication Data
US 2022/0277468 A1 Sep. 1, 2022

(30) Foreign Application Priority Data
Aug. 7, 2019 (CN) .......................... 201910727431.0

(51) Int. Cl.
*G06K 9/00* (2022.01)
*A61K 35/12* (2015.01)
(Continued)

(52) U.S. Cl.
CPC .................. *G06T 7/55* (2017.01); *G06T 7/80* (2017.01); *H04N 1/387* (2013.01); *H04N 9/3185* (2013.01)

(58) Field of Classification Search
CPC .......... G06K 9/00; G06T 7/80; H04N 9/8205; A61K 35/12
(Continued)

(56) References Cited

U.S. PATENT DOCUMENTS

2013/0033596 A1* 2/2013 Crothers .............. G01B 21/045
382/206
2014/0034731 A1* 2/2014 Gao ........................ G06K 7/146
235/438
(Continued)

FOREIGN PATENT DOCUMENTS

CN 108171758 A 6/2018
CN 109697737 A 4/2019
(Continued)

OTHER PUBLICATIONS

International Search Report for corresponding application PCT/CN2020/102491 filed Jul. 16, 2020; Mail date Oct. 15, 2020.

*Primary Examiner* — Seyed H Azarian
(74) *Attorney, Agent, or Firm* — Samson G. Yu

(57) ABSTRACT

Disclosed in the present disclosure is a calibration parameter obtaining method and apparatus, a processor, and an electronic device. The method includes that: multiple image collection elements are used to capture a calibration image in a calibration scene to obtain multiple images; point sets are obtained from the multiple images, and the point sets are imaging points corresponding to three-dimensional points on the surface of the calibration image in the multiple images; and calibration parameters to be used of the multiple image collection elements are obtained according to the point sets. The present disclosure solves the technical problem in the related art that multiple cameras cannot be integrally calibrated.

13 Claims, 3 Drawing Sheets

(51) Int. Cl.
*G06T 7/55* (2017.01)
*G06T 7/80* (2017.01)
*H04N 1/387* (2006.01)
*H04N 9/31* (2006.01)

(58) Field of Classification Search
USPC ....... 382/100, 103, 106–108, 123, 140, 151, 382/162, 168, 173, 181, 194, 199, 206, 382/215, 219–220, 224, 232, 254, 260, 382/276, 285, 154, 286–291, 305, 312; 348/187, 47; 235/438
See application file for complete search history.

(56) References Cited

U.S. PATENT DOCUMENTS

| | | | | |
|---|---|---|---|---|
| 2017/0254637 | A1* | 9/2017 | Nakano | G01C 3/08 |
| 2018/0108150 | A1* | 4/2018 | Curtis | G06T 7/246 |
| 2018/0336704 | A1* | 11/2018 | Javan Roshtkhari | G06T 7/80 |
| 2019/0098287 | A1 | 3/2019 | Cabral et al. | |
| 2019/0208181 | A1* | 7/2019 | Rowell | H04N 9/8205 |
| 2023/0298209 | A1* | 9/2023 | Habib | G06T 7/80 348/187 |

FOREIGN PATENT DOCUMENTS

| | | |
|---|---|---|
| CN | 109754427 A | 5/2019 |
| CN | 109767474 A | 5/2019 |
| CN | 109785390 A | 5/2019 |
| CN | 110009687 A | 7/2019 |
| EP | 1622083 A2 | 2/2006 |
| JP | 2008177763 A | 7/2008 |
| JP | 2015232442 A | 12/2015 |
| JP | 2017091186 A | 5/2017 |
| JP | 2018004420 A | 1/2018 |
| JP | 2018173882 A | 11/2018 |
| JP | 2019074699 A | 5/2019 |
| JP | 2019079468 A | 5/2019 |
| WO | 2018181249 A1 | 4/2018 |

* cited by examiner

CALIBRATION PARAMETER OBTAINING METHOD AND APPARATUS, PROCESSOR, AND ELECTRONIC DEVICE

CROSS-REFERENCE TO RELATED APPLICATION

The present disclosure is filed based upon and claims priority to Chinese Patent Application No. 201910727431.0, filed on Aug. 7, 2019, the disclosure of which is hereby incorporated by reference in its entirety.

TECHNICAL FIELD

The present disclosure relates to the field of image processing, and in particular to a calibration parameter obtaining method and apparatus, a processor, and an electronic device.

BACKGROUND

At present, simultaneous integration of three cameras in a mobile terminal (such as a smart phone) is developed prosperously on the market. Compared with the use of dual cameras, using three cameras has the advantage that the cameras are more diversified. For example, the three cameras may include a telephoto camera, a wide-angle camera, and an ultra-wide-angle camera. Such a combination may implement multifold zoom, improve a Field of View (FOV) greatly, and thus enrich user experiences greatly. However, a related art still has relatively serious technical defects in terms of integrated three-camera calibration. There are mainly the following two calibration manners at present.

A first manner is integrated Red Green Blue-Depth (RGB-D) calibration. In this manner, a wide-angle camera image and an infrared camera image are obtained by an ordinary camera (such as a wide-angle camera) and an infrared camera respectively at a certain distance, so as to obtain calibration parameters of the two cameras. However, multiple cameras cannot be integrally calibrated in this manner, which lies in that three cameras have greater differences in FOV, and particularly under the co-existence of a telephoto camera and an ultra-wide-angle camera, it is unlikely to obtain accurate calibration parameters by simultaneously capturing a calibration environment to obtain three image by the telephoto camera, a wide-angle camera, and the ultra-wide-angle camera at the same distance.

A second manner is integrated dual-camera calibration. In this manner, two images are obtained by two ordinary cameras (such as a telephoto camera and a wide-angle camera) at a certain distance, so as to obtain calibration parameters of the two cameras. However, multiple cameras cannot be integrally calibrated in this manner, which lies in that three cameras have greater differences in FOV, and particularly under the co-existence of a telephoto camera and an ultra-wide-angle camera, it is unlikely to obtain accurate calibration parameters by simultaneously capturing a calibration environment to obtain three images by the telephoto camera, a wide-angle camera, and the ultra-wide-angle camera at the same distance.

Thus it can be seen that, in the calibration manners provided in the related art, two images may be obtained to obtain calibration parameters of two cameras, but calibration parameters of three cameras cannot be obtained. That is, three cameras cannot be integrally calibrated at the same distance.

For the foregoing problems, there is yet no effective solution at present.

SUMMARY

At least some embodiments of the present disclosure provide a calibration parameter obtaining method and apparatus, a processor, and an electronic device, so as at least to partially solve the technical problem in the related art that multiple cameras cannot be integrally calibrated.

In one embodiment of the present disclosure, a calibration parameter obtaining method is provided, which includes that:

multiple image collection elements are used to capture a calibration image in a calibration scene to obtain multiple images; point sets are obtained from the multiple images, and the point sets are imaging points corresponding to three-dimensional points on the surface of the calibration image in the multiple images; and calibration parameters to be used of the multiple image collection elements are obtained according to the point sets.

Optionally, the operation that the calibration parameters to be used of the multiple image collection elements are obtained according to the point sets includes that: initial calibration parameters are determined according to the point sets; an error function is constructed based on re-projection errors obtained by the point sets; and the error function is minimized according to the initial calibration parameters to obtain the calibration parameters to be used.

Optionally, the operation that the initial calibration parameters are determined according to the point sets includes that: whether the number of the point sets is larger than a first preset threshold is determined; and the initial calibration parameters are obtained in response to determining that the number of the point sets is larger than the first preset threshold, and distances between positions of the multiple image collection elements and the calibration image are adjusted in response to determining that the number of the point sets is less than or equal to the first preset threshold until the number of the point sets is larger than the first preset threshold.

Optionally, the operation that the distances between positions of the multiple image collection elements and the calibration image are adjusted includes that: the distances between the positions of the multiple image collection elements and the calibration image are adjusted in a case that the multiple image collection elements simultaneously capture the calibration image such that a proportion of the calibration image in a field of view of each of the image collection elements satisfies a preset condition.

Optionally, the operation that the error function is minimized according to the initial calibration parameters to obtain the calibration parameters to be used may include that: the error function is minimized according to the initial calibration parameters to obtain a camera intrinsic matrix and a camera relative matrix; whether an error value of the error function is smaller than a second preset threshold is determined; and the camera intrinsic matrix and the camera relative matrix are determined as the calibration parameters to be used in response to determining that the error value of the error function is smaller than the second preset threshold, and new point sets are obtained from the multiple images in response to determining that the error value of the error function is larger than or equal to the second preset threshold until the error value of the error function is smaller than the second preset threshold.

Optionally, the multiple image collection elements are image collection images of the same type, or, the multiple image collection elements are image collection elements of different types. The types of the multiple image collection elements include at least one of a telephoto camera, a wide-angle camera, an ultra-wide-angle camera, an ultra-telephoto camera, a Time of Flight (TOF) depth camera, an RGB-D camera, a structured light depth camera, a Mono camera, a multinocular camera, and an infrared camera.

In another embodiment of the present disclosure, a calibration parameter obtaining apparatus is also provided, which includes:

a capturing module, configured to capture a calibration image in a calibration scene by using multiple image collection elements to obtain multiple images; an obtaining module, configured to obtain point sets from the multiple images, and the point sets are imaging points corresponding to three-dimensional points on the surface of the calibration image in the multiple images; and a calibration module, configured to obtain calibration parameters to be used of the multiple image collection elements according to the point sets.

Optionally, the calibration module includes: a determination unit, configured to determine initial calibration parameters according to the point sets; a construction unit, configured to construct an error function based on re-projection errors obtained by the point sets; and a processing unit, configured to minimize the error function according to the initial calibration parameters to obtain the calibration parameters to be used.

Optionally, the determination unit includes: a first determination subunit, configured to determine whether the number of the point sets is larger than a first preset threshold; and a first processing subunit, configured to obtain the initial calibration parameters in response to determining that the number of the point sets is larger than the first preset threshold, and adjust, in response to determining that the number of the point sets is less than or equal to the first preset threshold, distances between positions of the multiple image collection elements and the calibration image until the number of the point sets is larger than the first preset threshold.

Optionally, the first processing subunit is configured to adjust, in a case that the multiple image collection elements simultaneously capture the calibration image, the distances between the positions of the multiple image collection elements and the calibration image such that a proportion of the calibration image in a field of view of each of the image collection elements satisfies a preset condition.

Optionally, the processing unit includes: a second processing subunit, configured to minimize the error function according to the initial calibration parameters to obtain a camera intrinsic matrix and a camera relative matrix; a second determination subunit, configured to determine whether an error value of the error function is smaller than a second preset threshold; and a third processing subunit, configured to determine the camera intrinsic matrix and the camera relative matrix as the calibration parameters to be used in response to determining that the error value of the error function is smaller than the second preset threshold, and obtain, in response to determining that the error value of the error function is larger than or equal to the second preset threshold, new point sets from the multiple images until the error value of the error function is smaller than the second preset threshold.

In another embodiment of the present disclosure, a storage medium is provided. The storage medium is configured to store a computer program which is configured to run to execute the steps in any above-mentioned calibration parameter obtaining method.

In another embodiment of the application, a processor is also provided, which is configured to run a program, and the program is configured to run to execute any above-mentioned calibration parameter obtaining method.

In another embodiment of the present disclosure, an electronic device is also provided, which includes a memory and a processor. A computer program is stored in the memory. The processor is configured to run the computer program to execute any above-mentioned calibration parameter obtaining method.

In at least some of embodiments of the present disclosure, the multiple image collection elements may be used to capture the calibration image in the calibration scene to obtain the multiple images, the point sets are obtained from the multiple images, the point sets being the imaging points corresponding to the three-dimensional points on the surface of the calibration image in the multiple images, and the calibration parameters to be used of the multiple image collection elements are obtained according to the point sets. In this manner, a purpose of integrally calibrating the multiple image collection elements at the same distance is achieved, thereby achieving a technical effect of rectifying an original input image effectively by calibration parameters obtained by integrally calibrating multiple cameras and further solving the technical problem in the related art that a multiple cameras cannot be integrally calibrated.

BRIEF DESCRIPTION OF THE DRAWINGS

The drawings described here are used for providing a further understanding to the present disclosure and form a part of the application. Schematic embodiments of the present disclosure and descriptions thereof are used for explaining the present disclosure and not intended to form improper limits to the present disclosure. In the drawings.

DETAILED DESCRIPTION

Figure 1:
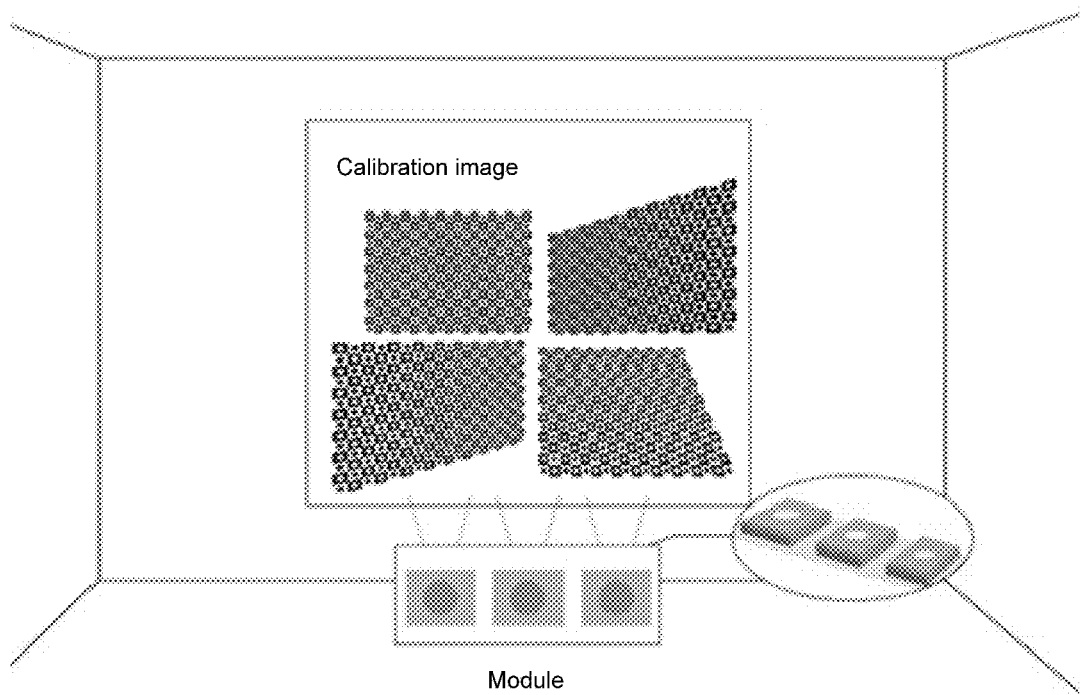
FIG. 1 is a schematic diagram of an application scene of a calibration parameter obtaining process according to an optional embodiment of the present disclosure.

In order to make the solutions of the present disclosure understood better by those skilled in the art, the technical solutions in the embodiments of the present disclosure will be described clearly and completely below in combination with the drawings in the embodiments of the present disclosure. It is apparent that the described embodiments are not all but only part of embodiments of the present disclosure. All other embodiments obtained by those of ordinary skill in the art based on the embodiments in the present disclosure without creative work shall fall within the scope of protection of the present disclosure.

It is to be noted that terms like "first" and "second" in the specification, claims and accompanying drawings of the present disclosure are used to differentiate similar objects and not necessarily to describe a specific order or a sequence. It is to be understood that data used like this may be interchanged as appropriate such that the embodiments of the present disclosure described here may be implemented in sequences besides those shown or described herein. In addition, terms "include" and "have" and any transformation thereof are intended to cover nonexclusive inclusions. For example, a process, method, system, product, or device including a series of steps or units is not limited to those clearly listed steps or units, but may include other steps or units which are not clearly listed or intrinsic to the process, the method, the system, the product, or the device.

First, part of nouns or terms appearing during the description about at least some of embodiments of the present disclosure are suitable to be explained as follows.

(1) Integrated multi-camera calibration refers to simultaneously capturing a calibration environment by multiple cameras (the number of the cameras is usually larger than or equal to two) to obtain an image respectively in the same environment so as to obtain calibration parameters, the camera parameters including camera intrinsic parameters and camera extrinsic parameters. In at least some of the following embodiments of the present disclosure, an integrated three-camera calibration process will be explained and described taking three cameras (for example, including a telephoto camera, a wide-angle camera, and an ultra-wide-angle camera) as an example.

It is to be noted that the above-mentioned multiple cameras may be cameras of the same type or cameras of different types. The multiple cameras may be calibrated by the solution disclosed in the embodiments of the present disclosure no matter whether the types and parameters of the multiple cameras are the same. In addition, the types of the multiple cameras may include, but not limited to, at least one of a telephoto camera, a wide-angle camera, an ultra-wide-angle camera, an ultra-telephoto camera, a TOF depth camera, an RGB-D camera, a structured light depth camera, a Mono camera, a multinocular camera, and an infrared camera.

(2) Camera intrinsic parameters include camera parameters such as a focal length, a principal point coordinate, and a distortion coefficient.

(3) A camera intrinsic matrix refers to filling a matrix with the intrinsic parameters and outputting the intrinsic parameters in a matrix form, and is actually another representation form of the camera intrinsic parameters.

(4) Camera extrinsic parameters include parameters of rotation, translation, etc., between cameras.

(5) A camera extrinsic matrix refers to filling a matrix with the extrinsic parameters and outputting the intrinsic parameters in a matrix form, and is actually another representation form of the camera extrinsic parameters.

(6) Rectify refers to transforming an original input image by use of calibration parameters in a manner that corresponding points are on the same horizontal line, the corresponding points referring to mutually corresponding imaging points formed by the same point in the calibration environment in images obtained by three cameras.

In an embodiment of the present disclosure, a calibration parameter obtaining method is provided. It is to be noted that the steps shown in the flowchart of the drawings may be executed in a computer system like a set of computer executable instructions. Moreover, although a logical sequence is shown in the flowchart, the shown or described steps may be executed in some cases in sequences different from that described here.

The method embodiment may be executed in a mobile terminal, a computer terminal, or a similar electronic device. Taking the execution in a mobile terminal as an example, the mobile terminal may include at least one processor (including, but not limited to, a processing apparatus such as a Central Processing Unit (CPU), a Graphics Processing Unit (GPU), a Digital Signal Processing (DSP) chip, a Micro Controller Unit (MCU), or a Field-Programmable Gate Array (FPGA), and a memory configured to store data. Optionally, the mobile terminal may further include a transmission device and an input/output device, which are configured for a communication function. Those of ordinary skill in the art should know that the above structure description is schematic and not intended to limit the structure of the mobile terminal. For example, the mobile terminal may further include components more or fewer than those in the structure description, or has a configuration different from the structure description.

The memory may be configured to store a computer program like a software program of application software and a module, such as a computer program corresponding to the calibration parameter obtaining method in the embodiments of the present disclosure. The processor runs the computer program stored in the memory, thereby executing various functional applications and data processing, namely implementing the above-mentioned calibration parameter obtaining method. The memory may include a high-speed Random Access Memory (RAM) or a non-transitory memory, such as one or more magnetic storage devices, flash memories or other non-transitory solid-state memories. In some examples, the memory may further include a memory arranged remotely relative to the processor, and the remote memory may be connected with a mobile terminal through a network. Examples of the network include, but not limited to, the Internet, an intranet of an enterprise, a local area network, a mobile communication network, and a combination thereof.

The transmission device is configured to receive or send data through a network. A specific example of the network may include a wireless network provided by a communication provider of the mobile terminal. In an example, the transmission device includes a Network Interface Controller (NIC), which may be connected with another network device through a base station, thereby communicating with the Internet. In an example, the transmission device may be a Radio Frequency (RF) module, configured to communicate with the Internet in a wireless manner.

FIG. 1 is a schematic diagram of an application scene of a calibration parameter obtaining process according to an optional embodiment of the present disclosure. Taking three cameras as an example, as shown in FIG. 1, the three cameras (for example, including a telephoto camera, a wide-angle camera, and an ultra-wide-angle camera) are located in the same module and arranged at a fixed distance in front of a calibration image such that a module manufacturer completes integrated three-camera calibration during the assembling of mobile phone modules. Of course, it is not limited in the present disclosure that the three cameras need to be in a module state, and other deployment manners may be used. For example, the three cameras may be mounted to a mobile terminal (such as a smart phone), or directly calibrated by the above-mentioned electronic device, or distributed in three different devices (such as a combination of a module, a mobile phone, and a camera).

Figure 2:
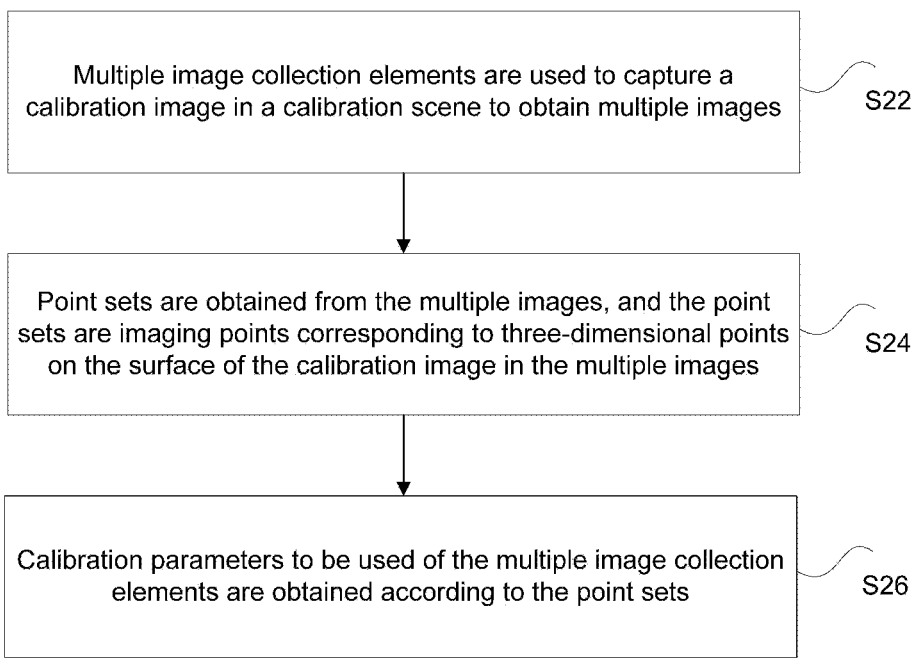
FIG. 2 is a flowchart of a calibration parameter obtaining method according to an embodiment of the present disclosure.

The embodiment provides a calibration parameter obtaining method running in the above-mentioned mobile terminal. FIG. 2 is a flowchart of a calibration parameter obtaining method according to an embodiment of the present disclosure. As shown in FIG. 2, the flow includes the following steps.

At step S22, multiple image collection elements are used to capture a calibration image in a calibration scene to obtain multiple images.

At step S24, point sets are obtained from the multiple images, and the point sets are imaging points corresponding to three-dimensional points on the surface of the calibration image in the multiple images.

At step S26, calibration parameters to be used of the multiple image collection elements are obtained according to the point sets.

Through the steps, the multiple image collection elements may be used to capture the calibration image in the calibration scene to obtain the multiple images, the point sets are obtained from the multiple images, the point sets being the imaging points corresponding to the three-dimensional points on the surface of the calibration image in the multiple images, and the calibration parameters to be used of the multiple image collection elements are obtained according to the point sets. In this manner, a purpose of integrally calibrating the multiple image collection elements at the same distance is achieved, thereby achieving a technical effect of rectifying an original input image effectively by calibration parameters obtained by integrally calibrating multiple cameras and further solving the technical problem in the related art that multiple cameras cannot be integrally calibrated.

In an optional embodiment, the calibration image may include multiple calibration templates, and each of the calibration templates consists of multiple checkerboards including round dots. One of the calibration templates is taken as a reference template, and the other calibration templates are placed at a predetermined included angle to the reference template in different directions respectively. For example, as shown in FIG. 1, the calibration image includes four independent calibration templates, and each of the calibration templates consists of 19*14 checkerboards including round dots. The top left calibration template is taken as a reference template, and the other three calibration templates are placed at an included angle of 30 degrees to the reference template in different directions respectively.

In another optional embodiment, when types of multiple cameras include a depth camera and an infrared camera, the calibration image may usually use a round phase rather than the above-mentioned checkerboard, which lies in that, compared with the checkerboard, the round phase is easily captured and positioned, thereby helping to integrally calibrate the multiple cameras and ensuring that a more accurate calibration result is obtained. In addition, images obtained by the depth camera and the infrared camera are dark, so that additional light supplementation is needed by the obtained images to improve resolutions of the images. As an optional example, an infrared Light-Emitting Diode (LED) lamp of the same band may be used to supplement light. For example, when an infrared emitter of the device uses 940 nm infrared light, a 940 nm infrared LED lamp is required to supplement light.

The above-mentioned multiple image collection elements may be multiple cameras. The number of the multiple image collection elements is larger than or equal to two.

Optionally, the operation in step S26 that the calibration parameters to be used of the multiple image collection elements are obtained according to the point sets may include the following execution steps.

At step S261, initial calibration parameters are determined according to the point sets.

At step S262, an error function is constructed based on re-projection errors obtained by the point sets.

At step S263, the error function is minimized according to the initial calibration parameters to obtain the calibration parameters to be used.

In an optional embodiment, taking three cameras (for example, including a telephoto camera, a wide-angle camera, and an ultra-wide-angle camera) as an example, the three cameras are located in the same module. An image collection environment (i.e., the calibration scene) is constructed, and this module is arranged at a fixed distance in front of the calibration image. Then, the three cameras are controlled to collect images, and point sets are recognized and stored. There are imaging points corresponding to the same point on the surface of the calibration image in the calibration scene in the images obtained by the three cameras respectively. These imaging points are mutually corresponding point sets. Finally, the initial calibration parameters, i.e., initial values of camera intrinsic parameters and camera extrinsic parameters, may be determined by use of these point sets (including, but not limited to, coordinates of the point sets and corresponding relationships between points).

Imaging point positions corresponding to three-dimensional points in the constructed image collection environment in the multiple practically obtained images may be referred to as true values (i.e., observed projection positions). Imaging point positions, calculated according to the calculated calibration parameters and an imaging model, corresponding to the three-dimensional points may be referred to as calculated values (i.e., positions obtained by projecting the three-dimensional point according to a present estimated pose). The calculation process is referred to as re-projection. Therefore, a difference between the calculated value of the imaging point and the true value of the imaging point is a re-projection error.

The error function is a mathematical function constructed according to the camera intrinsic parameters and the camera extrinsic parameters. Errors are calculated to determine whether the present calibration parameters are optimal. Minimizing the error function refers to iteratively optimizing the calibration parameters to minimize the errors, thereby obtaining optimal calibration parameters to be used.

Optionally, the operation in step S261 that the initial calibration parameters are determined according to the point sets may include the following steps.

At step S2611, whether the number of the point sets is larger than a first preset threshold is determined.

At step S2612, the initial calibration parameters are obtained in response to determining that the number of the point sets is larger than the first preset threshold, and distances between positions of the multiple image collection elements and the calibration image are adjusted in response to determining that the number of the point sets is less than or equal to the first preset threshold until the number of the point sets is larger than the first preset threshold.

When the initial calibration parameters are determined according to the point sets, it is necessary to determine whether the number of the point sets is larger than the first preset threshold. The initial calibration parameters may be obtained based on the present point sets in response to determining that the number of the point sets is larger than the first preset threshold. However, in response to determining that the number of the point sets is less than or equal to the first preset threshold, the distances between the positions of the multiple image collection elements and the calibration image need to be adjusted at first, and then new point sets are obtained from the multiple images until the number of the point sets is larger than the first preset threshold, so as to obtain the initial calibration parameters based on latest obtained point sets.

In an optional embodiment, the distances between the positions of the multiple image collection elements and the calibration image are adjusted in a case that the multiple image collection elements simultaneously capture the calibration image such that a proportion of the calibration image in a field of view of each of the image collection elements satisfies a preset condition. For example, a preset proportion value may be taken as the preset condition. When the proportion of the calibration image in the FOV of each of the image collection elements is higher than the preset proportion value, it is unnecessary to continue adjusting the distances between the positions of the multiple image collection elements and the calibration image. When the proportion of the calibration image in the FOV of each of the image collection elements does not reach the preset proportion value, it is necessary to continue adjusting the distances between the positions of the multiple image collection elements and the calibration image.

Optionally, the operation in step S263 that the error function is minimized according to the initial calibration parameters to obtain the calibration parameters to be used may include the following execution steps.

At step S2631, the error function is minimized according to the initial calibration parameters to obtain a camera intrinsic matrix and a camera relative matrix.

At step S2632, whether an error value of the error function is smaller than a second preset threshold is determined.

At step S2633, the camera intrinsic matrix and the camera relative matrix are determined as the calibration parameters to be used in response to determining that the error value of the error function is smaller than the second preset threshold, and new point sets are obtained from the multiple images in response to determining that the error value of the error function is larger than or equal to the second preset threshold until the error value of the error function is smaller than the second preset threshold.

After the error function is constructed based on the re-projection errors obtained by the point sets, the error function is minimized to obtain the camera intrinsic matrix and the camera extrinsic matrix. During the minimization, whether the error value calculated through the error function is smaller than the second preset threshold may be determined. When determining that the error value calculated through the error function is smaller than the preset threshold, it indicates that the minimization process has been completed. When determining that the error value of the error function is larger than or equal to the second preset threshold, new point sets need to be obtained from the multiple images until the error value of the error function is smaller than the second preset threshold. In case of determining that the error value calculated by the error function is smaller than the preset threshold, the camera intrinsic matrix and camera extrinsic matrix obtained by the minimization may be determined as the final calibration parameters to be used, and the camera intrinsic matrix and the camera extrinsic matrix need not to be additionally processed.

Figure 3:
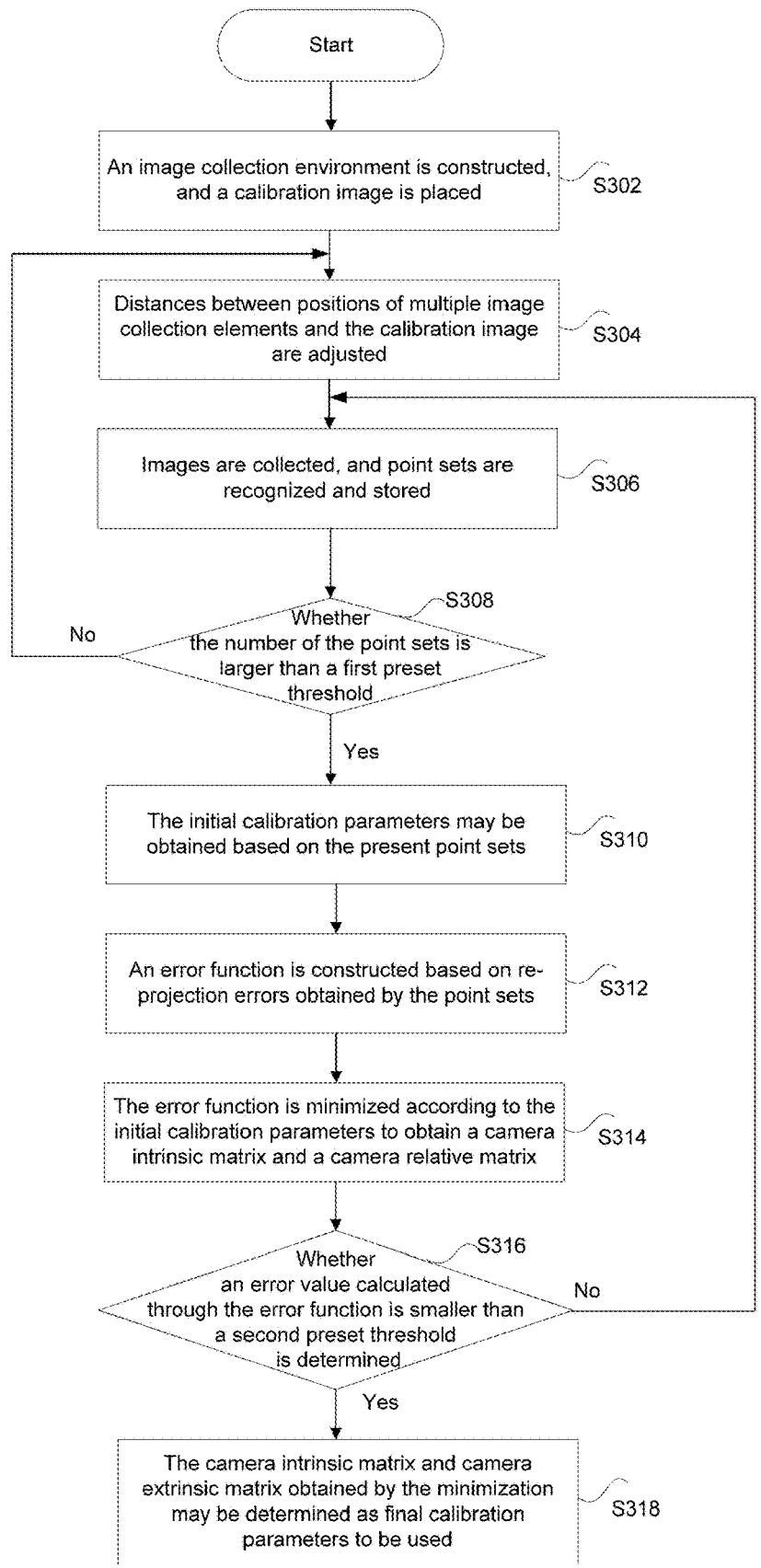
FIG. 3 is a flowchart of a calibration parameter obtaining method according to an optional embodiment of the present disclosure.

The above-mentioned optional implementation process will be further described in detail below through an optional implementation mode shown in FIG. 3. FIG. 3 is a flowchart of a calibration parameter obtaining method according to an optional embodiment of the present disclosure. As shown in FIG. 3, the flow includes the following steps.

At step S302, an image collection environment is constructed, and a calibration image is placed.

At step S304, distances between positions of multiple image collection elements and the calibration image are adjusted such that a proportion of the calibration image in a field of view of each of the image collection elements satisfies a preset condition.

At step S306, images are collected, and point sets are recognized and stored.

There is imaging points corresponding to the same point on the surface of the calibration image in a calibration scene in images obtained by three cameras respectively. These imaging points are mutually corresponding point sets.

At step S308, whether the number of the point sets is larger than a first preset threshold; when the number of the point sets is larger than the first preset threshold, S310 continues to be executed, namely initial calibration parameters need to be obtained; and when the number of the point sets is not larger than a first preset threshold, S304 is executed.

At step S310, the initial calibration parameters may be obtained based on the present point sets when determining that the number of the point sets is larger than the first preset threshold.

At step S312, an error function is constructed based on re-projection errors obtained by the point sets.

At step S314, the error function is minimized according to the initial calibration parameters to obtain a camera intrinsic matrix and a camera relative matrix.

The error function is a mathematical function constructed according to camera intrinsic parameters and camera extrinsic parameters. Errors are calculated to determine whether the present calibration parameters are optimal. Minimizing the error function refers to iteratively optimizing the calibration parameters to minimize the errors, thereby obtaining optimal calibration parameters.

At step S316, whether an error value calculated through the error function is smaller than a second preset threshold is determined; when the error value is smaller than the second preset threshold, S318 continues to be executed, namely the minimization process has been completed; and when the error value is not smaller than the second preset threshold, S306 is re-executed.

At step S318, in case of determining that the error value calculated by the error function is smaller than the preset threshold, the camera intrinsic matrix and camera extrinsic matrix obtained by the minimization may be determined as final calibration parameters to be used, and the camera intrinsic matrix and the camera extrinsic matrix need not to be additionally processed.

Through the descriptions about the above implementation modes, those skilled in the art may clearly know that the method according to the embodiment may be implemented by combining software and a required universal hardware platform, or may be implemented by hardware, of course, but the former are optional implementation modes in many cases. Based on such an understanding, the technical solutions of the present disclosure substantially or parts making contributions to the related art may be embodied in form of a software product. The computer software product is stored in a storage medium (for example, a Read-Only Memory (ROM)/RAM, a magnetic disk, and an optical disk), including multiple instructions configured to enable a terminal device (which may be a mobile phone, a computer, a server, a network device, etc.) to execute the method of each embodiment of the present disclosure.

The embodiment also provides a calibration parameter obtaining apparatus, which is configured to implement the above-mentioned embodiments and optional implementation modes. What has been described will not be elaborated. For example, term "module" used below may be a combination of software and/or hardware capable of realizing a preset function. Although the apparatus described in the following embodiment is preferably implemented with software, implementation with hardware or a combination of software and hardware is also possible and conceivable.

Figure 4:
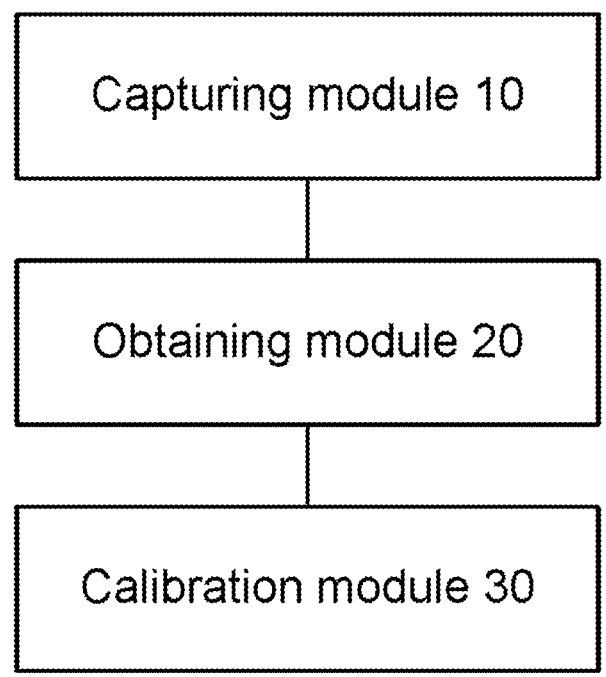
FIG. 4 is a structural block diagram of a calibration parameter obtaining apparatus according to an embodiment of the present disclosure.

FIG. 4 is a structural block diagram of a calibration parameter obtaining apparatus according to an embodiment of the present disclosure. As shown in FIG. 4, the apparatus includes: a capturing module 10, configured to capture a calibration image in a calibration scene by using multiple image collection elements to obtain multiple images; an obtaining module 20, configured to obtain point sets from the multiple images, and the point sets are imaging points corresponding to three-dimensional points on the surface of the calibration image in the multiple images; and a calibration module 30, configured to obtain calibration parameters to be used of the multiple image collection elements according to the point sets.

Optionally, the calibration module 30 includes: a determination unit (not shown in the figure), configured to determine initial calibration parameters according to the point sets; a construction unit (not shown in the figure), configured to construct an error function based on re-projection errors obtained by the point sets; and a processing unit (not shown in the figure), configured to minimize the error function according to the initial calibration parameters to obtain the calibration parameters to be used.

Optionally, the determination unit (not shown in the figure) includes: a first determination subunit (not shown in the figure), configured to determine whether the number of the point sets is larger than a first preset threshold; and a first processing subunit (not shown in the figure), configured to obtain the initial calibration parameters in response to determining that the number of the point sets is larger than the first preset threshold, and adjust, in response to determining that the number of the point sets is less than or equal to the first preset threshold, distances between positions of the multiple image collection elements and the calibration image until the number of the point sets is larger than the first preset threshold.

Optionally, the first processing subunit (not shown in the figure) is configured to adjust, in a case that the multiple image collection elements simultaneously capture the calibration image, the distances between the positions of the multiple image collection elements and the calibration image such that a proportion of the calibration image in a field of view of each of the image collection elements satisfies a preset condition.

Optionally, the processing unit (not shown in the figure) includes: a second processing subunit (not shown in the figure), configured to minimize the error function according to the initial calibration parameters to obtain a camera intrinsic matrix and a camera relative matrix; a second determination subunit (not shown in the figure), configured to determine whether an error value of the error function is smaller than a second preset threshold; and a third processing subunit (not shown in the figure), configured to determine the camera intrinsic matrix and the camera relative matrix as the calibration parameters to be used in response to determining that the error value of the error function is smaller than the second preset threshold, and obtain, in response to determining that the error value of the error function is larger than or equal to the second preset threshold, new point sets from the multiple images until the error value of the error function is smaller than the second preset threshold.

It is to be noted that each of the modules may be implemented by software or hardware, and under the latter condition, may be implemented in, but not limited to, the following manner: the modules are all in the same processor, or the modules are in different processors in any combination form respectively.

An embodiment of the present disclosure also provides a storage medium configured to store a computer program which is configured to run to execute the steps in any above-mentioned method embodiment.

Optionally, in the embodiment, the storage medium may be configured to store a computer program for executing the following steps:

S1: multiple image collection elements are used to capture a calibration image in a calibration scene to obtain multiple images.

S2: point sets are obtained from the multiple images, and the point sets are imaging points corresponding to three-dimensional points on the surface of the calibration image in the multiple images.

S3: calibration parameters to be used of the multiple image collection elements are obtained according to the point sets.

Optionally, the storage medium is further configured to store a computer program for executing the following steps: determining initial calibration parameters according to the point sets; constructing an error function based on re-projection errors obtained by the point sets; and minimizing the error function according to the initial calibration parameters to obtain the calibration parameters to be used.

Optionally, the storage medium is further configured to store a computer program for executing the following steps: determining whether the number of the point sets is larger than a first preset threshold; and obtaining the initial calibration parameters in response to determining that the number of the point sets is larger than the first preset threshold, and adjusting distances between positions of the multiple image collection elements and the calibration image in response to determining that the number of the point sets is less than or equal to the first preset threshold until the number of the point sets is larger than the first preset threshold.

Optionally, the storage medium is further configured to store a computer program for executing the following step: adjusting, in a case that the multiple image collection elements simultaneously capture the calibration image, the distances between the positions of the multiple image collection elements and the calibration image such that a proportion of the calibration image in a field of view of each of the image collection elements satisfies a preset condition.

Optionally, the storage medium is further configured to store a computer program for executing the following steps: minimizing the error function according to the initial calibration parameters to obtain a camera intrinsic matrix and a camera relative matrix; determining whether an error value of the error function is smaller than a second preset threshold; and determining the camera intrinsic matrix and the camera relative matrix as the calibration parameters to be used in response to determining that the error value of the error function is smaller than the second preset threshold, and obtaining new point sets from the multiple images in response to determining that the error value of the error function is larger than or equal to the second preset threshold until the error value of the error function is smaller than the second preset threshold.

Optionally, in the embodiment, the storage medium may include, but not limited to, various media capable of storing computer programs such as a U disk, a ROM, a RAM, a mobile hard disk, a magnetic disk, or an optical disk.

An embodiment of the present disclosure also provides a processor, which is configured to run a computer program to execute the steps in any above-mentioned method embodiment.

Optionally, in the embodiment, the processor in the embodiment may be configured to execute the following steps through the computer program:
- S1: multiple image collection elements are used to capture a calibration image in a calibration scene to obtain multiple images.
- S2: point sets are obtained from the multiple images, and the point sets are imaging points corresponding to three-dimensional points on the surface of the calibration image in the multiple images.
- S3: calibration parameters to be used of the multiple image collection elements are obtained according to the point sets.

Optionally, the processor is further configured to execute the following steps through the computer program: determining initial calibration parameters according to the point sets; constructing an error function based on re-projection errors obtained by the point sets; and minimizing the error function according to the initial calibration parameters to obtain the calibration parameters to be used.

Optionally, the processor is further configured to execute the following steps through the computer program: determining whether the number of the point sets is larger than a first preset threshold; and obtaining the initial calibration parameters in response to determining that the number of the point sets is larger than the first preset threshold, and adjusting distances between positions of the multiple image collection elements and the calibration image in response to determining that the number of the point sets is less than or equal to the first preset threshold until the number of the point sets is larger than the first preset threshold.

Optionally, the processor is further configured to execute the following step through the computer program: adjusting, in a case that the multiple image collection elements simultaneously capture the calibration image, the distances between the positions of the multiple image collection elements and the calibration image such that a proportion of the calibration image in a field of view of each of the image collection elements satisfies a preset condition.

Optionally, the processor is further configured to execute the following steps through the computer program: setting initial extrinsic parameters; minimizing the error function according to the initial calibration parameters to obtain a camera intrinsic matrix and a camera relative matrix; determining whether an error value of the error function is smaller than a second preset threshold; and determining the camera intrinsic matrix and the camera relative matrix as the calibration parameters to be used in response to determining that the error value of the error function is smaller than the second preset threshold, and obtaining new point sets from the multiple images in response to determining that the error value of the error function is larger than or equal to the second preset threshold until the error value of the error function is smaller than the second preset threshold.

Optionally, specific examples in the embodiment may refer to the examples described in the above-mentioned embodiments and optional implementation modes, and will not be elaborated in the embodiment.

The sequence numbers of the embodiments of the present disclosure are for description and do not represent the superiority-inferiority of the embodiments.

In the embodiments of the present disclosure, the descriptions of the embodiments focus on different aspects. The part which is not described in a certain embodiment in detail may refer to the related description of the other embodiments.

In some embodiments provided in the application, it is to be understood that the disclosed technical contents may be implemented in other manners. The device embodiment described above is schematic. For example, division of the units is division of logical functions, and other division manners may be adopted during practical implementation. For example, multiple units or components may be combined or integrated to another system, or some features may be ignored or are not executed. In addition, shown or discussed coupling, direct coupling or communication connection may be implemented through indirect coupling or communication connection of some interfaces, units, or modules, and may be in an electrical form or other forms.

The units described as separate parts may or may not be separate physically. Parts displayed as units may or may not be physical units, that is, they may be located in the same place, or may be distributed to multiple units. Part or all of the units may be selected to achieve the objectives of the solutions of the embodiments as practically required.

In addition, each function unit in each embodiment of the present disclosure may be integrated into a processing unit. Alternatively, each unit may exist independently. Alternatively, at least two units may be integrated into a unit. The integrated unit may be implemented in a hardware form, or may be implemented in form of a software function unit.

When implemented in form of a software function unit and sold or used as an independent product, the integrated unit may be stored in a computer-readable storage medium. Based on such an understanding, the technical solutions of the present disclosure substantially or parts making contributions to the conventional art or all or part of the technical solutions may be embodied in form of a software product. The computer software product is stored in a storage medium, including multiple instructions configured to enable a computer device (which may be a PC, a server, a network device, etc.) to execute all or part of the steps of the method in each embodiment of the present disclosure. The storage medium includes various media capable of storing program codes such as a U disk, a ROM, a RAM, a mobile hard disk, a magnetic disk, or a compact disc.

The above are optional embodiments of the present disclosure. It is to be pointed out that those of ordinary skill in the art may also make a number of improvements and embellishments without departing from the principle of the present disclosure, and these improvements and embellishments shall also fall within the scope of protection of the present disclosure.

What is claimed is:

1. A calibration parameter obtaining method, comprising: capturing a calibration image in a calibration scene by using a plurality of image collection cameras to obtain a plurality of images; obtaining point sets from the plurality of images, wherein the point sets are imaging points corresponding to three-dimensional points on the surface of the calibration image in the plurality of images; and obtaining calibration parameters to be used of the plurality of image collection cameras according to the point sets;

wherein the plurality of image collection cameras are three cameras, the three cameras are located in the same module, and this module is arranged at a fixed distance in front of the calibration image, and the calibration image comprises a plurality of calibration templates, and each of the calibration templates consists of a plurality of checkerboards comprising round dots;

wherein one of the calibration templates is taken as a reference template, and the other calibration templates are placed at a predetermined included angle to the reference template in different directions respectively.

2. The method as claimed in claim 1, wherein obtaining the calibration parameters to be used of the plurality of image collection cameras according to the point sets comprises: determining initial calibration parameters according to the point sets;

constructing an error function based on re-projection errors obtained by the point sets; and minimizing the error function according to the initial calibration parameters to obtain the calibration parameters to be used.

3. The method as claimed in claim 2, wherein determining the initial calibration parameters according to the point sets comprises: determining whether the number of the point sets is larger than a first preset threshold; and obtaining the initial calibration parameters in response to determining that the number of the point sets is larger than the first preset threshold, and adjusting, in response to determining that the number of the point sets is less than or equal to the first preset threshold, distances between positions of the plurality of image collection cameras and the calibration image until the number of the point sets is larger than the first preset threshold.

4. The method as claimed in claim 3, wherein adjusting the distances between positions of the plurality of image collection cameras and the calibration image comprises: adjusting, in a case that the plurality of image collection elements simultaneously capture the calibration image, the distances between the positions of the plurality of image collection cameras and the calibration image such that a proportion of the calibration image in a field of view of each of the image collection cameras satisfies a preset condition.

5. The method as claimed in claim 4, wherein the proportion of the calibration image in the field of view of each of the image collection cameras satisfying the preset condition refers to the proportion of the calibration image in the field of view of each of the image collection cameras being higher than a preset proportion value.

6. The method as claimed in claim 2, wherein minimizing the error function according to the initial calibration parameters to obtain the calibration parameters to be used comprises:

minimizing the error function according to the initial calibration parameters to obtain a camera intrinsic matrix and a camera relative matrix;

determining whether an error value of the error function is smaller than a second preset threshold; and determining the camera intrinsic matrix and the camera relative matrix as the calibration parameters to be used in response to determining that the error value of the error function is smaller than the second preset threshold, and obtaining, in response to determining that the error value of the error function is larger than or equal to the second preset threshold, new point sets from the plurality of images until the error value of the error function is smaller than the second preset threshold.

7. The method as claimed in claim 2, wherein the initial calibration parameters comprise initial values of camera intrinsic parameters and camera extrinsic parameters.

8. The method as claimed in claim 7, wherein the error function is a mathematical function constructed according to the camera intrinsic parameters and the camera extrinsic parameters.

9. The method as claimed in claim 1, wherein the plurality of image collection cameras are image collection images of the same type, or, the plurality of image collection cameras are image collection elements of different types, wherein the types of the plurality of image collection cameras comprise at least one of a telephoto camera, a wide-angle camera, an ultra-wide-angle camera, an ultra-telephoto camera, a Time of Flight (TOF) depth camera, a Red Green Blue-Depth (RGB-D) camera, a structured light depth camera, a Mono camera, a multinocular camera, and an infrared camera.

10. The method as claimed in claim 1, wherein the plurality of image collection cameras are mounted to the same device, or the plurality of image collection cameras are distributed in different devices.

11. The method as claimed in claim 1, wherein the number of the multiple image collection cameras is larger than or equal to two.

12. A non-transitory storage medium configured to store a computer program which is configured to run to execute the calibration parameter obtaining method steps: capturing a calibration image in a calibration scene by using a plurality of image collection cameras to obtain a plurality of images; obtaining point sets from the plurality of images, wherein the point sets are imaging points corresponding to three-dimensional points on the surface of the calibration image in the plurality of images; and obtaining calibration parameters to be used of the plurality of image collection cameras according to the point sets;

wherein the plurality of image collection cameras are three cameras, the three cameras are located in the same module, and this module is arranged at a fixed distance in front of the calibration image, and the calibration image comprises a plurality of calibration templates, and each of the calibration templates consists of a plurality of checkerboards comprising round dots;

wherein one of the calibration templates is taken as a reference template, and the other calibration templates are placed at a predetermined included angle to the reference template in different directions respectively.

13. An electronic device, comprising a memory and a processor, wherein a non-transitory computer readable medium program is stored in the memory, and the processor is configured to run the computer program to execute the calibration parameter obtaining method comprising the following steps: capturing a calibration image in a calibration scene by using a plurality of image collection cameras to obtain a plurality of images; obtaining point sets from the plurality of images, wherein the point sets are imaging points corresponding to three-dimensional points on the surface of the calibration image in the plurality of images; and obtaining calibration parameters to be used of the plurality of image collection cameras according to the point sets;

wherein the plurality of image collection cameras are three cameras, the three cameras are located in the same module, and this module is arranged at a fixed distance in front of the calibration image, and the calibration image comprises a plurality of calibration templates, and each of the calibration templates consists of a plurality of checkerboards comprising round dots;

wherein one of the calibration templates is taken as a reference template, and the other calibration templates are placed at a predetermined included angle to the reference template in different directions respectively.

* * * * *